(12) United States Patent
Naiki (10) Patent No.: US 12,466,724 B2
(45) Date of Patent: Nov. 11, 2025

(54) MEMS MIRROR AND MEMS MIRROR ARRAY SYSTEM

(71) Applicant: ROHM Co., LTD., Kyoto (JP)

(72) Inventor: Takashi Naiki, Kyoto (JP)

(73) Assignee: ROHM CO., LTD., Kyoto (JP)

(\*) Notice: Subject to any disclaimer, the term of this patent is extended or adjusted under 35 U.S.C. 154(b) by 442 days.

(21) Appl. No.: 18/057,852

(22) Filed: Nov. 22, 2022

(65) Prior Publication Data

US 2023/0159323 A1 May 25, 2023

(30) Foreign Application Priority Data

Nov. 24, 2021 (JP) ................................. 2021-190008

(51) Int. Cl.
G02B 26/08 (2006.01)
B81B 7/02 (2006.01)

(52) U.S. Cl.
CPC ............ B81B 7/02 (2013.01); G02B 26/0858 (2013.01); *B81B 2201/042* (2013.01); *B81B 2203/0109* (2013.01); *B81B 2203/04* (2013.01); *B81B 2207/053* (2013.01)

(58) Field of Classification Search
CPC .............. B81B 7/02; B81B 2201/042; B81B 2203/0109; B81B 2203/04; B81B 2207/053; B81B 3/0045; G02B 26/0858; G02B 26/0833; G02B 26/0841
See application file for complete search history.

(56) References Cited

U.S. PATENT DOCUMENTS

2018/0210190 A1\* 7/2018 Okada ................ G02B 26/0858
2022/0179070 A1\* 6/2022 Loya ..................... G02B 26/101

FOREIGN PATENT DOCUMENTS

| JP | 2008-116668 A | 5/2008 |
| JP | 2008-145839 A | 6/2008 |
| JP | 2015-514228 A | 5/2015 |
| JP | 2017-22576 | 1/2017 |
| WO | 2021192161 A1 | 9/2021 |

OTHER PUBLICATIONS

Office Action for corresponding Japanese application JP 2021-190008 mailed Jun. 27, 2025.

\* cited by examiner

*Primary Examiner* — Euncha P Cherry
(74) *Attorney, Agent, or Firm* — CHIP LAW GROUP (57) ABSTRACT

Disclosed is a MEMS mirror including a flat plate that is displaceable in a film thickness direction, a frame part that is separated from the flat plate and surrounds the flat plate, a support part that connects the flat plate and the frame part and is smaller in film thickness than the frame part, and a piezoelectric body for control that is arranged on the support part. A control voltage is applied to the piezoelectric body for control to deform the piezoelectric body for control and deform the support part together with the deformation of the piezoelectric body for control, to thereby adjust a spring constant of the support part.

7 Claims, 10 Drawing Sheets

MEMS MIRROR AND MEMS MIRROR ARRAY SYSTEM

CROSS REFERENCE TO RELATED APPLICATIONS

This application claims priority benefit of Japanese Patent Application No. 2021-190008 filed in the Japan Patent Office on Nov. 24, 2021. Each of the above-referenced applications is hereby incorporated herein by reference in its entirety.

BACKGROUND

Embodiments of the present disclosure relate to a microelectromechanical systems (MEMS) mirror and a MEMS mirror array system.

In a device such as a MEMS mirror having a movable flat plate, the flat plate is displaced in the film thickness direction by Coulomb force (electrostatic), Lorentz force (electromagnetic), or piezoelectric stress (piezoelectric), for example. The displacement of the flat plate puts stress on a support part that supports the flat plate, and twisting force or other force is applied to the support part by the stress, resulting in generation of vibration in the flat plate. The generated vibration inclines the flat plate. The inclination of the flat plate becomes the most efficient state when being driven at the resonance frequency (natural frequency) of the flat plate.

An example of the related art is disclosed in Japanese Patent Laid-open No. 2017-22576.

SUMMARY

However, the movable flat plate has structural variations in size and thickness, for example, in the manufacturing process, and the variations of the movable flat cause variations in the spring constant of a part that functions as a spring for moving the flat plate. As a result, the natural frequency which is the optimum driving frequency of the device varies in each device. Therefore, it is important to grasp the natural frequency of each device when using the device. Further, in the case where the driving frequency of the device is preliminarily set, if the natural frequency deviates from the driving frequency, the efficiency is deteriorated. In addition, it is difficult to inspect the natural frequency every time it deviates from the driving frequency and adjust the driving frequency.

It is desirable to provide a MEMS mirror capable of adjusting a natural frequency, and a MEMS mirror array system including a MEMS mirror array having a plurality of the MEMS mirrors.

According to an embodiment of the present disclosure, there is provided a MEMS mirror including a flat plate that is displaceable in a film thickness direction, a frame part that is separated from the flat plate and surrounds the flat plate, a support part that connects the flat plate and the frame part and is smaller in film thickness than the frame part, and a piezoelectric body for control that is arranged on the support part. A control voltage is applied to the piezoelectric body for control to deform the piezoelectric body for control and deform the support part together with the deformation of the piezoelectric body for control, to thereby adjust a spring constant of the support part.

In addition, according to another embodiment of the present disclosure, there is provided a MEMS mirror array system including a MEMS mirror array that has a plurality of the above-described MEMS mirrors on a base mount, and a driving control unit that controls a control voltage applied to each of piezoelectric bodies for control included in the plurality of MEMS mirrors.

According to the embodiments of the present disclosure, it is possible to provide a MEMS mirror capable of adjusting a natural frequency, and a MEMS mirror array system including a MEMS mirror array having a plurality of the MEMS mirrors.

DETAILED DESCRIPTION OF THE PREFERRED EMBODIMENTS

Now, embodiments of the present disclosure will be described with reference to the drawings. In the description of the drawings to be described below, the same or similar parts are denoted by the same or similar reference signs. However, it is important to note that the drawings are schematic, and the relation between the thickness and the plane dimension of each constitutional component or other relation is different from the actual one. Therefore, the specific thickness and dimension should be determined in consideration of the following description. In addition, it is obvious that the dimensional relation or the ratio of constitutional components may differ between the drawings.

In addition, the embodiments described below exemplify devices and methods for embodying the technical ideas, and do not specify the material, shape, structure, arrangement, and other configuration of each constitutional component. Various changes can be made to the embodiments in the claims.

One example of the specific embodiment is as follows.

<1> A MEMS mirror including a flat plate that is displaceable in a film thickness direction, a frame part that is separated from the flat plate and surrounds the flat plate, a support part that connects the flat plate and the frame part and is smaller in film thickness than the frame part, and a piezoelectric body for control that is arranged on the support part, in which a control voltage is applied to the piezoelectric body for control to deform the piezoelectric body for control and deform the support part together with the deformation of the piezoelectric body for control, to thereby adjust a spring constant of the support part.

<2> The MEMS mirror according to <1>, in which the support part includes a shaft part with a double-supported beam shape that has one end connected to the flat plate and another end connected to the frame part and that is arranged between the flat plate and the frame part.

<3> The MEMS mirror according to claim <1>, in which the support part includes a beam part with a double-supported beam shape that has opposite ends connected to the frame part, and a shaft part with a double-supported beam shape that has one end connected to the flat plate and another end connected to the beam part.

According to <1> to <3>, the control voltage is applied to the piezoelectric body for control to deform the piezoelectric body for control, and the support part including the shaft part and/or the beam part is also deformed together with the deformation of the piezoelectric body for control. The deformation of the support part changes the spring constant of the support part itself. Accordingly, the natural frequencies of the flat plate and the MEMS mirror can be adjusted by adjusting the control voltage applied to the piezoelectric body for control.

<4> The MEMS mirror according to any one of <1> to <3>, in which the support part is made of the same material as the flat plate.

<5> The MEMS mirror according to any one of <1> to <4>, in which the support part is made of the same material as the frame part.

<6> The MEMS mirror according to any one of <1> to <5>, in which materials of the flat plate and the support part contain silicon.

According to <4> to <6>, since the frame part, the flat plate, and the support part including the shaft part and/or the beam part are made of the same material, they can be formed as one body, and the manufacturing process can thus be further simplified.

<7> A MEMS mirror array system including a MEMS mirror array that has a plurality of the MEMS mirrors according to any one of <1> to <6> on a base mount, and a driving control unit that controls a control voltage applied to each of piezoelectric bodies for control included in the plurality of MEMS mirrors.

According to <7>, the natural frequencies of the plurality of MEMS mirrors included in the MEMS mirror array can be aligned, or the natural frequencies of some of the MEMS mirrors can be adjusted. Thus, each of the MEMS mirrors can efficiently be driven when the plurality of MEMS mirrors is synchronously driven.

<MEMS Mirror>

A MEMS mirror according to an embodiment of the present disclosure will be described by using the drawings.

Figure 1:
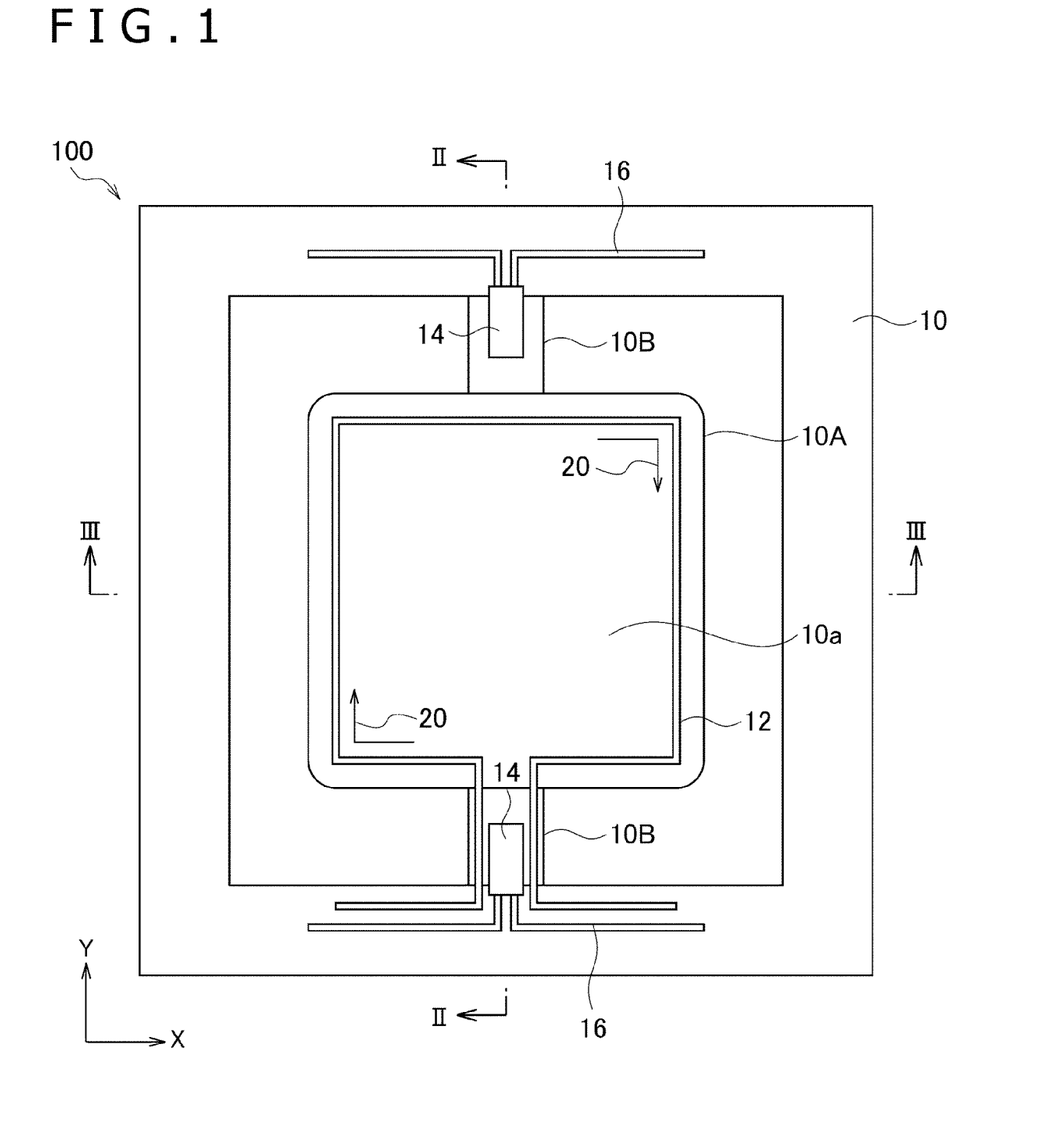
FIG. 1 is a plan view for illustrating a MEMS mirror according to an embodiment of the present disclosure.
Figure 2:
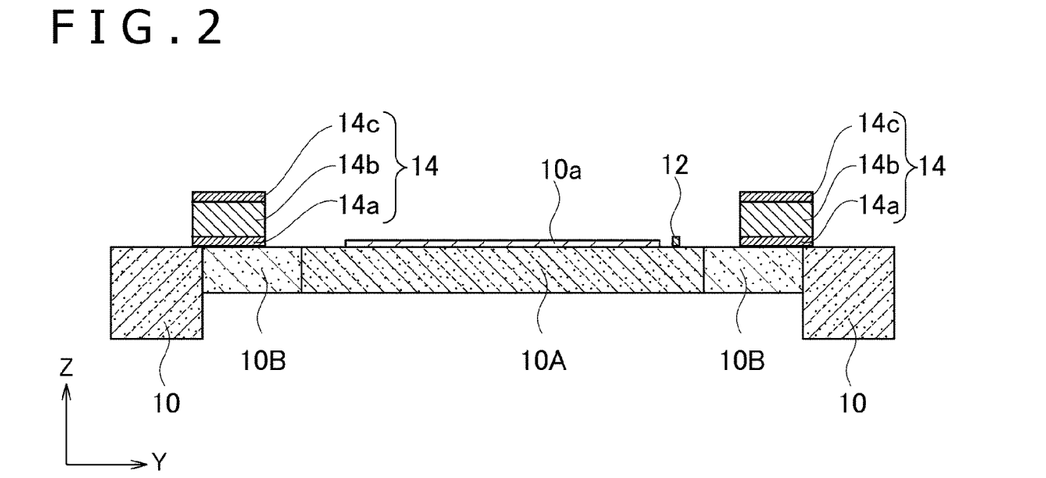
FIG. 2 is a cross-sectional view taken along the line II-II of FIG. 1.
Figure 3:
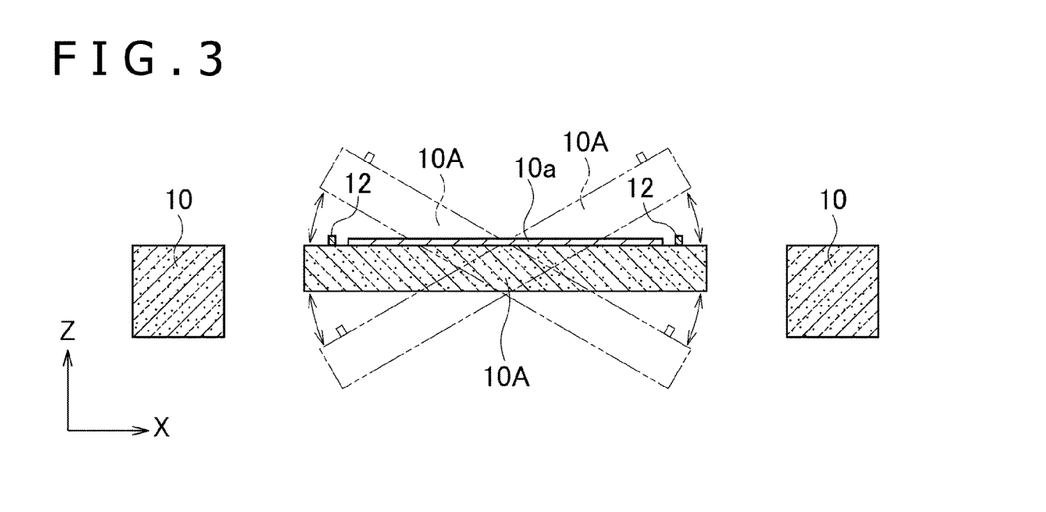
FIG. 3 is a cross-sectional view taken along the line III-III of FIG. 1.

FIG. 1 is a plan view for illustrating a MEMS mirror according to the present embodiment. FIG. 2 is a cross-sectional view taken along the line II-II of FIG. 1. FIG. 3 is a cross-sectional view taken along the line III-III of FIG. 1. A MEMS mirror 100 of the present embodiment includes a flat plate 10A that is displaceable in the film thickness direction, a frame part 10 that is separated from the flat plate 10A and that surrounds the flat plate 10A, shaft parts 10B that connect the flat plate 10A and the frame part 10 and that are smaller in film thickness than the frame part 10, piezoelectric bodies for control 14 that are arranged on the shaft parts 10B, wirings 16 that are electrically connected to the piezoelectric bodies for control 14 and that control the piezoelectric bodies for control 14, and a wiring 12 that is arranged on the outer edge of the flat plate 10A and on the shaft part 10B and the frame part 10. It should be noted that, although not illustrated in the drawing, the wiring 12 and the wirings 16 are electrically connected to a driving control unit to be described later. The piezoelectric bodies for control 14 are arranged on the respective two shaft parts 10B disposed to sandwich the flat plate 10A.

In addition, in the present specification, a case where parts are "electrically connected" includes a case where the connection is made through "a part having some electrical action." Here, "a part having some electrical action" is not limited to a particular one as long as it enables transmission and reception of electrical signals between the objects to be connected to each other. For example, "a part having some electrical action" includes an electrode, a wiring, a switching element, a resistive element, an inductor, a capacitive element, or other elements having various functions.

In the present embodiment, the longitudinal direction in which the shaft parts 10B linearly extend is defined as a Y direction, the direction perpendicular to the Y direction and parallel to an upper surface of the flat plate 10A is defined as an X direction, and the direction corresponding to the thickness of the flat plate 10A and other parts is defined as a Z direction. In other words, the Z direction is perpendicular to each of the X direction and the Y direction. In addition, the direction in which the piezoelectric bodies for control 14 are located when viewed from the frame part 10 is defined as an upper direction, and the direction in which the frame part 10 is located when viewed from the piezoelectric bodies for control 14 is defined as a lower direction. In the following description, the vertical direction is defined on the basis of the state of the MEMS mirror 100 illustrated in FIG. 2, but the direction in which the MEMS mirror 100 is used is not limited to the defined direction.

Each of the frame part 10, the flat plate 10A, and the shaft parts 10B is formed by processing a base mount (a base mount 110 illustrated in FIG. 14 to be described later) made of, for example, silicon. That is, the frame part 10, the flat plate 10A, and the shaft parts 10B are made of the same material, and the manufacturing process can be further simplified by forming them as one body.

Each of the shaft parts 10B has a double-supported beam shape with the opposite ends fixed. One end of the shaft part 10B is connected to the flat plate 10A, and the other end is connected to the frame part 10. The shaft part 10B is arranged between the flat plate 10A and the frame part 10. Each of the shaft parts 10B functions as a spring for assisting the movement of the flat plate 10A when the flat plate 10A is moved. When the shaft part 10B functions as the spring, the shaft part 10B adjusts the spring constant by its own deformation. The shaft part 10B also functions as a support part for supporting the flat plate 10A. Each of the shaft parts 10B can be formed by being etched such that the film thickness thereof becomes smaller than that of the frame part 10 when the base mount is processed.

The piezoelectric bodies for control 14 are arranged on the respective shaft parts 10B, which are support parts, and a control voltage is applied to the piezoelectric bodies for control 14 via the wirings 16 to deform the piezoelectric bodies for control 14. As the piezoelectric bodies for control 14 deform, opposite ends of each shaft part 10B are deformed to pull each other, so that the shaft parts 10B become hardened and the spring constant of the shaft parts 10B increases. If the control voltage is adjusted, the piezoelectric bodies for control 14 are deformed by application of the adjusted control voltage, and the shaft parts 10B are also deformed together with the deformation of the piezoelectric bodies for control 14. As a result, the spring constant of the shaft parts 10B can be adjusted, and the natural frequency of the flat plate 10A connected to the shaft parts 10B can also be adjusted. In addition, since the piezoelectric bodies for control 14 are arranged on the respective two shaft parts 10B, the twisting of the respective shaft parts 10B can be made uniform by reducing the difference between the functions of the two shaft parts 10B as springs, and the loads on the respective shaft parts 10B can also be made uniform. With the above uniformity, rotational vibration in a constant cycle in an X-Z plane can be achieved.

The control voltage may be, for example, 0 V or any fixed voltage, a sine wave of 0 to 5 V, a unipolar pulse, a bipolar pulse, a burst wave, or a continuous wave. In addition, the voltage to be applied to the piezoelectric bodies for control 14 can be a voltage modulated by a filter or other processing. For example, a voltage to be applied to one electrode (an electrode 14a to be described later, for example) is modulated, and the modulated voltage can be applied to another electrode (an electrode 14c to be described later, for example). Accordingly, the number of electrode pads and the types of driving voltages to be applied can be reduced, and the manufacturing process can be further simplified.

The wiring 12 functions as a metal coil. When a current flows through the wiring 12 arranged on the outer edge of the flat plate 10A, the Lorentz force is generated according to the Fleming's rule, and the flat plate 10A inclines. Specifically, when the wiring 12 functioning as a metal coil is arranged in the direction perpendicular to the magnetic field (the direction of the magnetic force is the X direction) and a current is allowed to flow in the direction of arrows 20 illustrated in FIG. 1, the Lorentz force is applied to the wiring 12 in the Z direction. The magnitude of the Lorentz force is proportional to the strength of the current and the magnetic field.

As illustrated in FIG. 3, the flat plate 10A is configured to be displaceable in the film thickness direction (Z direction). Specifically, the displacement of the flat plate 10A in the film thickness direction by the Lorentz force becomes possible by making the shaft parts 10B function as rotary shafts and separating the flat plate 10A from the frame part 10.

In addition, a mirror 10a is provided on the flat plate 10A, and the mirror 10a inclines with the inclination of the flat plate 10A. By adjusting the spring constant of the shaft parts 10B and the above-described Lorentz force, the mirror 10a can rotate around a rotation axis extending in the Y direction and can rotate and vibrate in the X-Z plane. Accordingly, the optical path of laser light incident on a mirror surface can be changed, and the MEMS mirror 100 can be driven at the natural frequency in the most efficient state.

The mirror 10a is not limited to a particular one as long as it has a mirror surface that reflects laser light or other light, and may be a metal layer having a reflectance of 90% or more and formed by, for example, vapor deposition or printing.

For the wiring 12 and the wirings 16, for example, copper wires, aluminum wires, and copper-clad aluminum wires (CCAW) can be used. In addition, the wiring 12 and the wirings 16 may be covered with an insulating film, and the insulating film is made of, for example, enamel or resin.

Each of the piezoelectric bodies for control 14 is a piezoelectric element, and includes a pair of electrodes 14a and 14c and a piezoelectric film 14b sandwiched between the pair of electrodes 14a and 14c. The pair of electrodes 14a and 14c and the piezoelectric film 14b are, for example, rectangular.

Each of the pair of electrodes 14a and 14c includes a thin film of metal having conductivity, such as platinum, molybdenum, iridium, or titanium. One electrode 14c is located on top of the piezoelectric film 14b and is connected to the wiring 16 for applying the control voltage to the electrode 14c. The other electrode 14a is located under the piezoelectric film 14b and is connected to the wiring 16 for applying the control voltage to the electrode 14a.

The piezoelectric film 14b is made of, for example, lead zirconate titanate (PZT). In addition to lead zirconate titanate, aluminum nitride (AlN), zinc oxide (ZnO), lead titanate ($PbTiO_3$), or other materials can be used for the piezoelectric film 14b.

When the control voltage is applied to each of the electrode 14a and the electrode 14c, a potential difference occurs between the electrode 14a and the electrode 14c. The potential difference deforms the piezoelectric bodies for control 14. As described above, as the piezoelectric bodies for control 14 deform, the shaft parts 10B deform, resulting in a change in the natural frequency of the flat plate 10A. In the present embodiment, the control voltage to be applied to the piezoelectric bodies for control 14 is adjusted, and accordingly, the natural frequency of the MEMS mirror 100 can be adjusted.

First Modified Example

Figure 4:
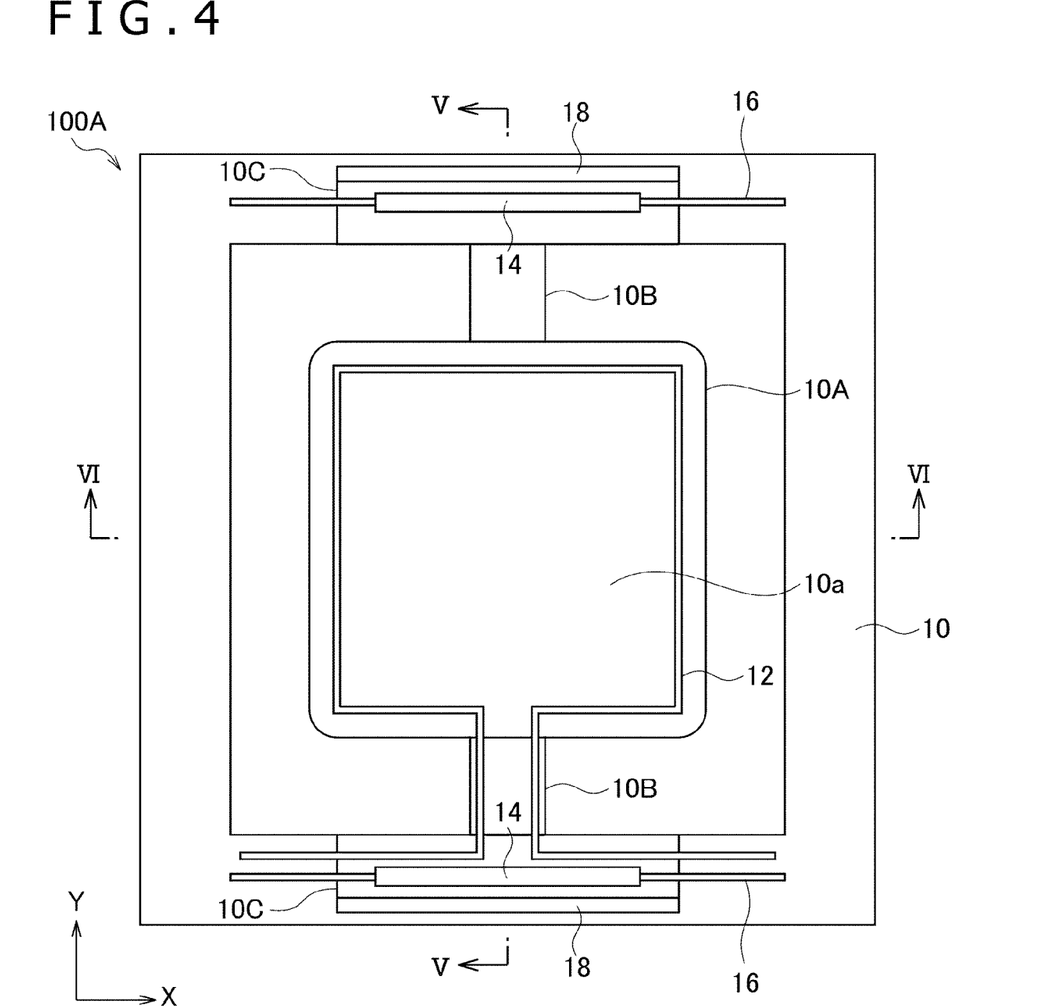
FIG. 4 is a plan view for illustrating a MEMS mirror according to a first modified example of the embodiment.
Figure 5:
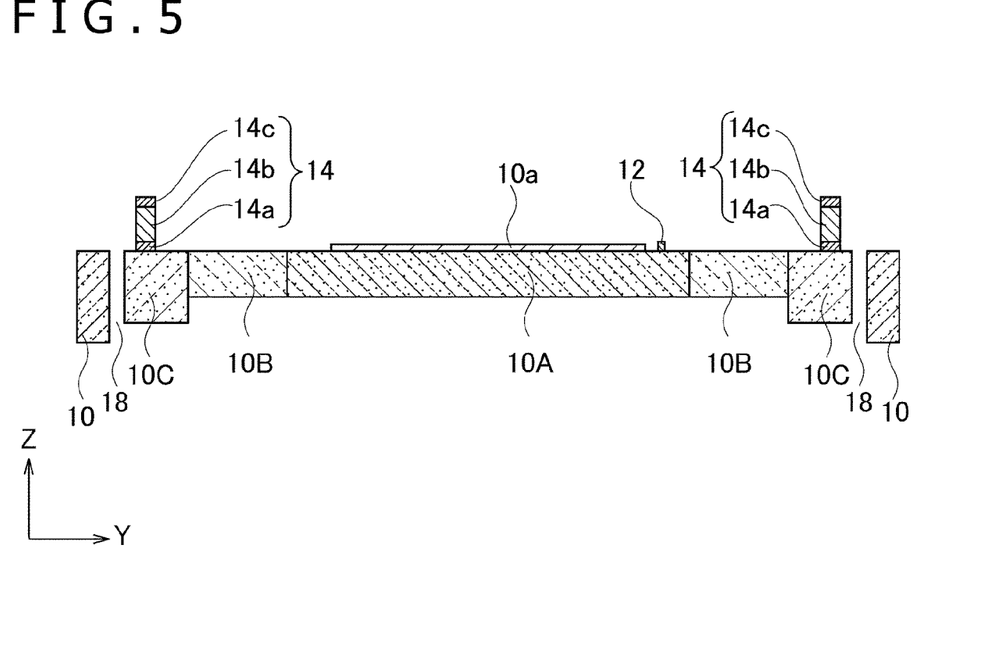
FIG. 5 is a cross-sectional view taken along the line V-V of FIG. 4.
Figure 6:
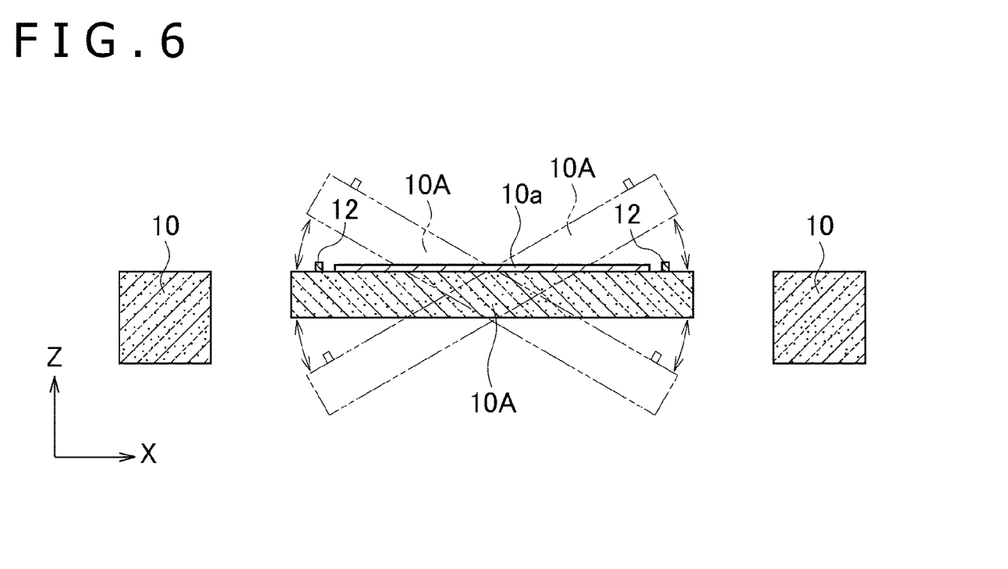
FIG. 6 is a cross-sectional view taken along the line VI-VI of FIG. 4.

A configuration of a MEMS mirror 100A according to a modified example of the present embodiment will be described by using FIG. 4 to FIG. 6. FIG. 4 is a plan view for illustrating the MEMS mirror 100A. FIG. 5 is a cross-sectional view taken along the line V-V of FIG. 4. FIG. 6 is a cross-sectional view taken along the line VI-VI of FIG. 4. The MEMS mirror 100A of the present modified example includes a flat plate 10A that is displaceable in the film thickness direction, a frame part 10 that is separated from the flat plate 10A and that surrounds the flat plate 10A, beam parts 10C that each have opposite ends connected to the frame part 10 and that are smaller in film thickness than the frame part 10, shaft parts 10B that connect the flat plate 10A and the beam parts 10C and that are smaller in film thickness than the frame part 10, piezoelectric bodies for control 14 that are arranged on the beam parts 10C, wirings 16 that are electrically connected to the piezoelectric bodies for control 14 and that control the piezoelectric bodies for control 14, and a wiring 12 that is arranged on the outer edge of the flat plate 10A and on the beam part 10C, the shaft part 10B, and the frame part 10. The MEMS mirror 100A in the present modified example is different from the above-described MEMS mirror 100 illustrated in FIG. 1 to FIG. 3 in that the piezoelectric bodies for control 14 are arranged on the beam parts 10C in place of the piezoelectric bodies for control 14 arranged on the shaft parts 10B. In the present modified example, the above description will be applied to parts common to the MEMS mirror 100A and the MEMS mirror 100 illustrated in FIG. 1 to FIG. 3, and different parts will be described below.

Each of the beam parts 10C is arranged between a groove part 18 provided in the frame part 10 and a region (space) defined between the frame part 10 and the flat plate 10A, and has a double-supported beam shape with the opposite ends fixed to the frame part 10. Each of the beam parts 10C functions as a spring for assisting the movement of the flat plate 10A when the flat plate 10A is moved. When the beam part 10C functions as the spring, the beam part 10C adjusts the spring constant by its own deformation. The beam part 10C also functions as a support part for supporting the flat plate 10A. Each of the beam parts 10C can be formed by being etched such that the film thickness thereof becomes smaller than that of the frame part 10 when the base mount is processed.

The piezoelectric bodies for control 14 are arranged on the respective beam parts 10C, which are support parts, and a control voltage is applied to the piezoelectric bodies for control 14 via the wirings 16 to deform the piezoelectric bodies for control 14. As the piezoelectric bodies for control 14 deform, opposite ends of each beam part 10C are deformed to pull each other, so that the beam parts 10C become hardened and the spring constant of the beam parts 10C increases. If the control voltage is adjusted, the piezoelectric bodies for control 14 are deformed by application of the adjusted control voltage, and the beam parts 10C are also deformed together with the deformation of the piezoelectric bodies for control 14. As a result, the spring constant of the beam parts 10C can be adjusted, and the natural frequency of the flat plate 10A connected to the support parts including the shaft parts 10B and the beam parts 10C can also be adjusted.

As described above, when the control voltage is applied to each of the electrode 14a and the electrode 14c of the piezoelectric bodies for control 14, a potential difference occurs between the electrode 14a and the electrode 14c. The piezoelectric bodies for control 14 are deformed by the potential difference, and as the piezoelectric bodies for control 14 deform, the beam parts 10C deform, resulting in a change in the natural frequency of the flat plate 10A. In the present modified example, the control voltage to be applied to the piezoelectric bodies for control 14 is adjusted, and accordingly, the natural frequency of the MEMS mirror 100A can be adjusted.

Second Modified Example

Figure 7:
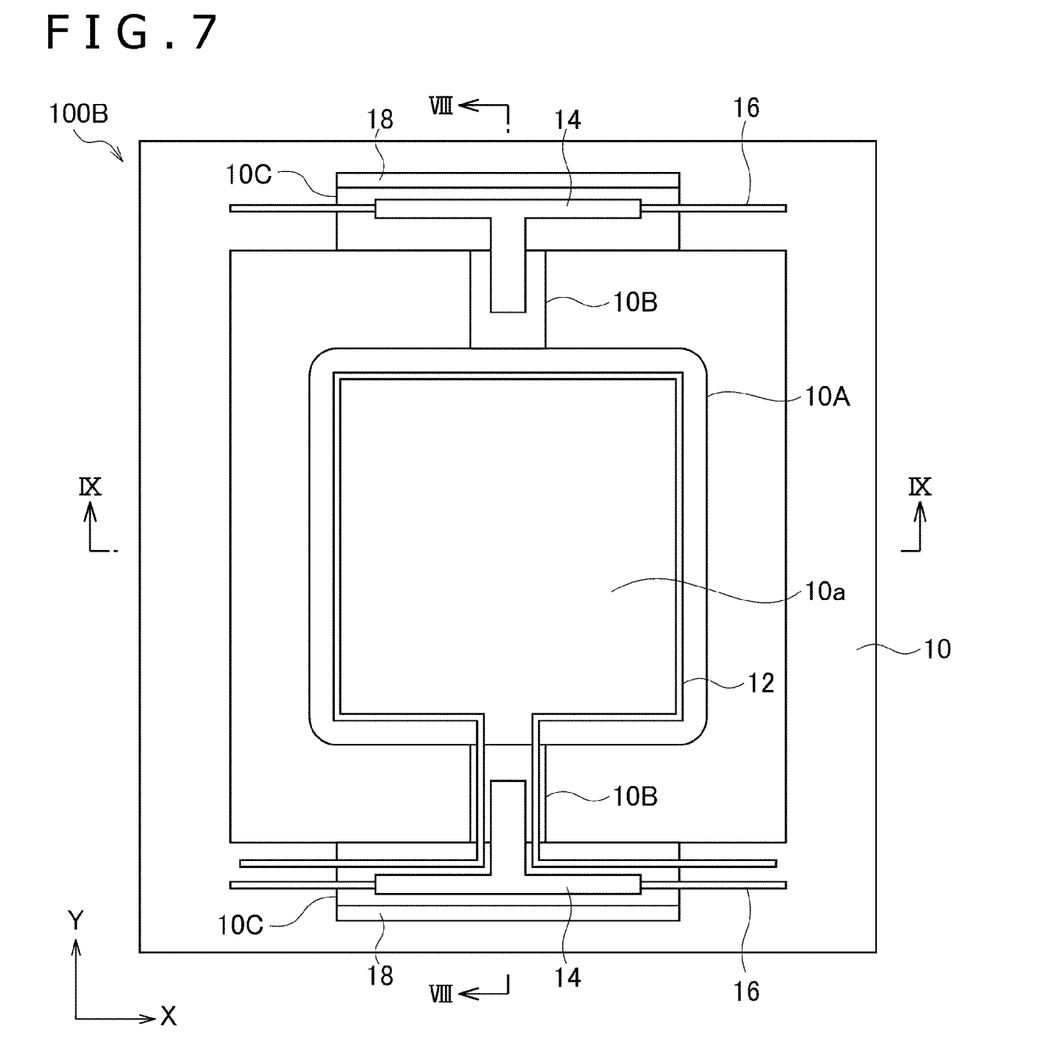
FIG. 7 is a plan view for illustrating a MEMS mirror according to a second modified example of the embodiment.
Figure 8:
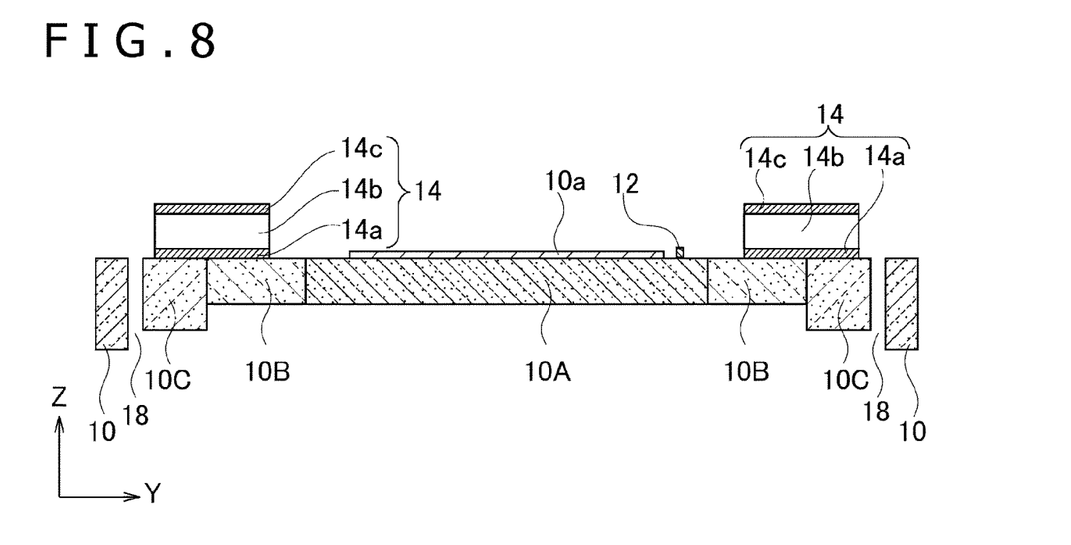
FIG. 8 is a cross-sectional view taken along the line VIII-VIII of FIG. 7.
Figure 9:
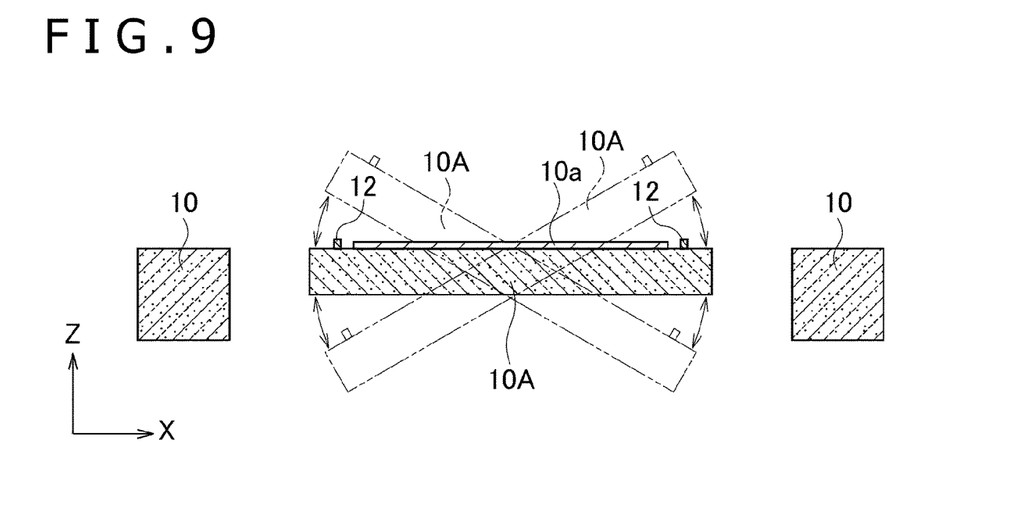
FIG. 9 is a cross-sectional view taken along the line IX-IX of FIG. 7.

A configuration of a MEMS mirror 100B according a modified example of the present embodiment will be described by using FIG. 7 to FIG. 9. FIG. 7 is a plan view for illustrating the MEMS mirror 100B. FIG. 8 is a cross-sectional view taken along the line VIII-VIII of FIG. 7. FIG. 9 is a cross-sectional view taken along the line IX-IX of FIG. 7. The MEMS mirror 100B of the present modified example includes a flat plate 10A that is displaceable in the film thickness direction, a frame part 10 that is separated from the flat plate 10A and that surrounds the flat plate 10A, beam parts 10C that each have opposite ends connected to the frame part 10 and that are smaller in film thickness than the frame part 10, shaft parts 10B that connect the flat plate 10A and the beam parts 10C and that are smaller in film thickness than the frame part 10, piezoelectric bodies for control 14 that are continuously arranged on the shaft parts 10B and the beam parts 10C, wirings 16 that are electrically connected to the piezoelectric bodies for control 14 and that control the piezoelectric bodies for control 14, and a wiring 12 that is arranged on the outer edge of the flat plate 10A and on the beam part 10C, the shaft part 10B, and the frame part 10. The MEMS mirror 100B in the present modified example is different from the above-described MEMS mirror 100A illustrated in FIG. 4 to FIG. 6 in that the piezoelectric bodies for control 14 are arranged on the shaft parts 10B and the beam parts 10C. In the present modified example, the above description will be applied to parts common to MEMS mirror 100B and the MEMS mirror 100A illustrated in FIG. 4 to FIG. 6, and different parts will be described below.

Since the piezoelectric bodies for control 14 are arranged on the shaft parts 10B and the beam parts 10C, the shaft parts 10B and the beam parts 10C are deformed as the piezoelectric bodies for control 14 are deformed by application of the control voltage. In the case where the spring constant of the shaft parts 10B and the spring constant of the beam parts 10C are different from each other, the natural frequency of the flat plate 10A connected to the support parts including the shaft parts 10B and the beam parts 10C can be adjusted more finely by adjusting the positional relation between the piezoelectric bodies for control 14 and the shaft parts 10B and between the piezoelectric bodies for control 14 and the beam parts 10C.

As described above, when the control voltage is applied to each of the electrode 14a and the electrode 14c of the piezoelectric bodies for control 14, a potential difference occurs between the electrode 14a and the electrode 14c. The piezoelectric bodies for control 14 are deformed by the potential difference, and as the piezoelectric bodies for control 14 deform, the shaft parts 10B and the beam parts 10C deform, resulting in a change in the natural frequency of the flat plate 10A. In the present modified example, since the force required to deform the support parts is smaller than the case where the piezoelectric bodies for control 14 are arranged on either the shaft parts 10B or the beam parts 10C, the potential difference between the electrode 14a and the electrode 14c can be reduced, and the natural frequency of the flat plate 10A can be adjusted with a small control voltage. In the present modified example, the control voltage to be applied to the piezoelectric bodies for control 14 is adjusted, and accordingly, the natural frequency of the MEMS mirror 100B can be adjusted.

Third Modified Example

Figure 10:
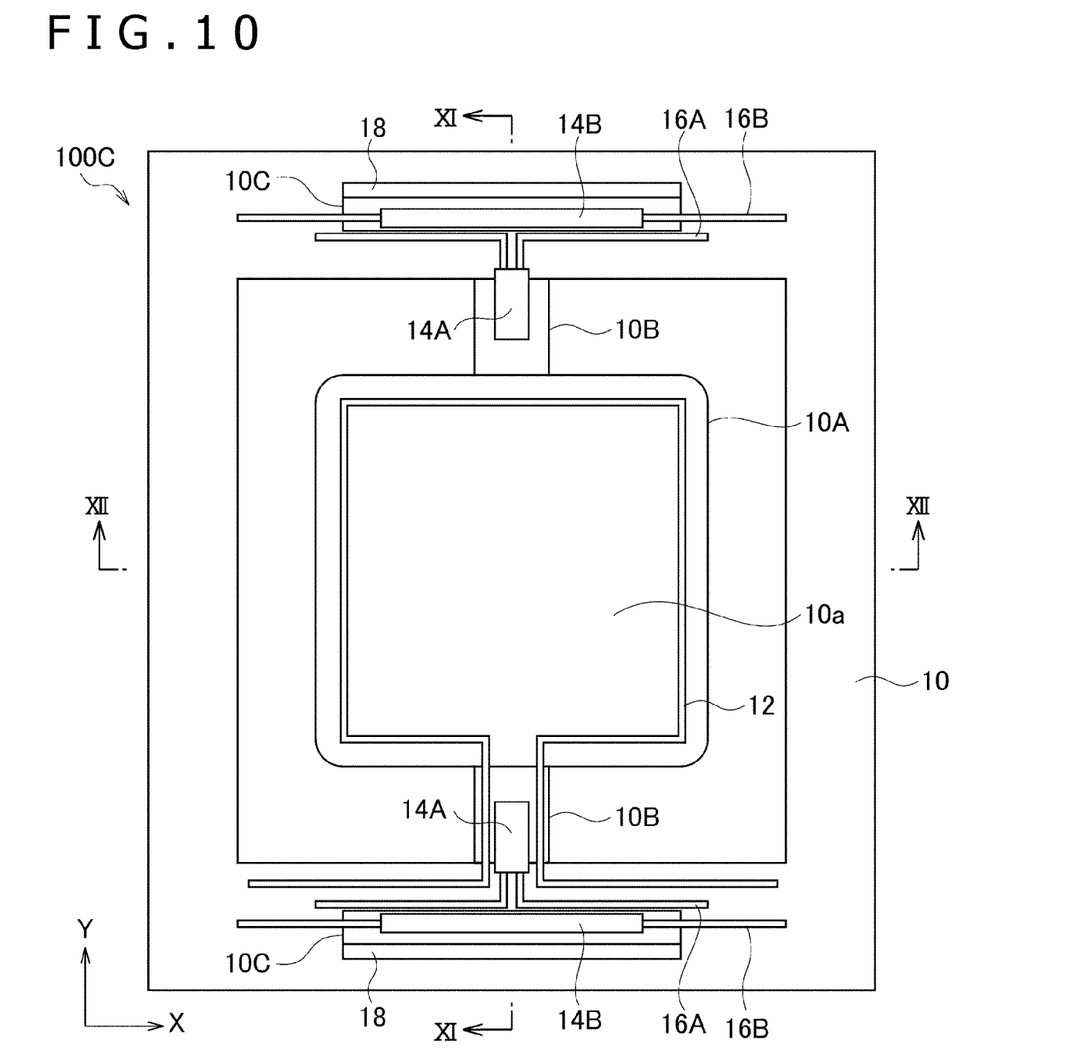
FIG. 10 is a plan view for illustrating a MEMS mirror according to a third modified example of the embodiment.
Figure 11:
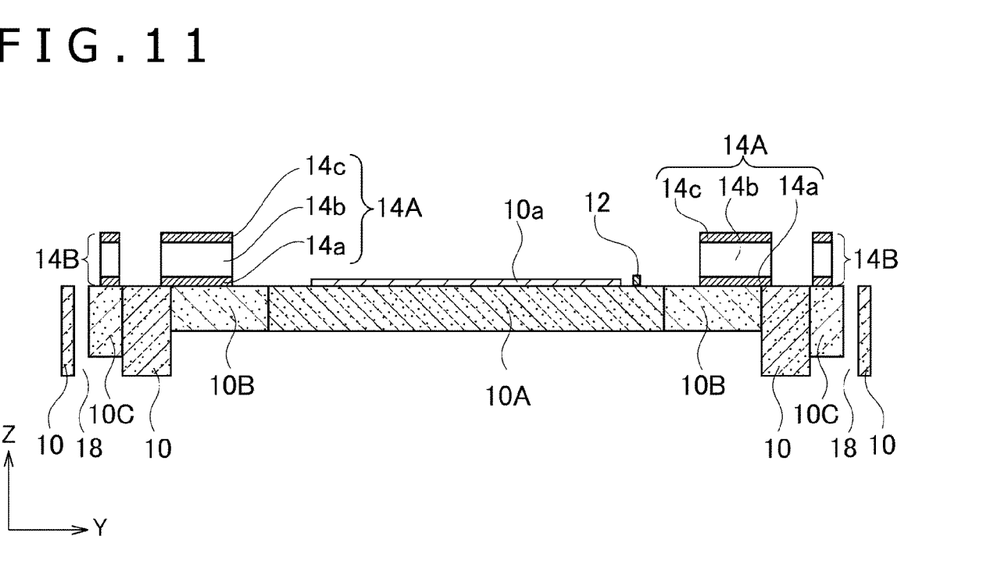
FIG. 11 is a cross-sectional view taken along the line XI-XI of FIG. 10.
Figure 12:
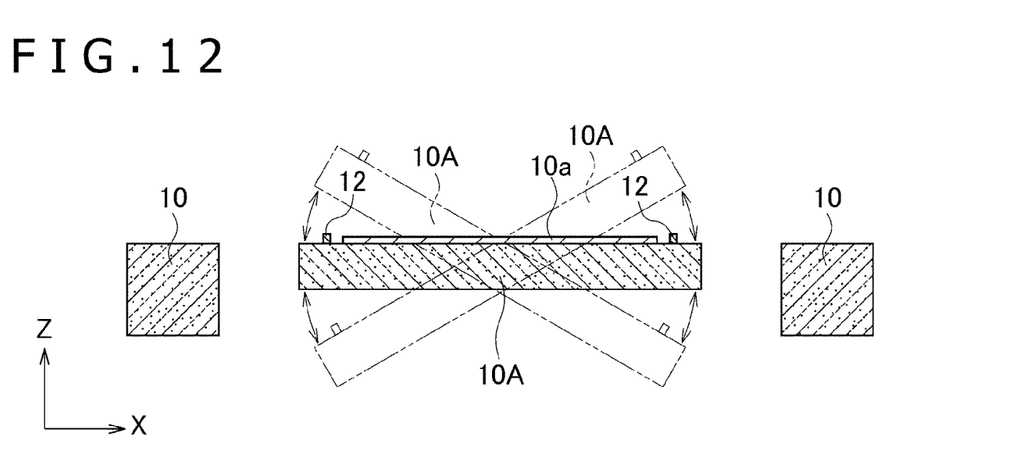
FIG. 12 is a cross-sectional view taken along the line XII-XII of FIG. 10.

A configuration of a MEMS mirror 100C according to a modified example of the present embodiment will be described by using FIG. 10 to FIG. 12. FIG. 10 is a plan view for illustrating the MEMS mirror 100C. FIG. 11 is a cross-sectional view taken along the line XI-XI of FIG. 10. FIG. 12 is a cross-sectional view taken along the line XII-XII of FIG. 10. The MEMS mirror 100C of the present modified example includes a flat plate 10A that is displaceable in the film thickness direction, a frame part 10 that is separated from the flat plate 10A and that surrounds the flat plate 10A, beam parts 10C that each have opposite ends connected to the frame part 10 and that are smaller in film thickness than the frame part 10, shaft parts 10B that connect the flat plate 10A and the beam parts 10C and that are smaller in film thickness than the frame part 10, piezoelectric bodies for control 14A that are arranged on the shaft parts 10B, piezoelectric bodies for control 14B that are arranged on the beam parts 10C, wirings 16A that control the piezoelectric bodies for control 14A, wirings 16B that control the piezoelectric bodies for control 14B, and a wiring 12 that is arranged on the outer edge of the flat plate 10A and on the shaft part 10B and the frame part 10. The MEMS mirror 100C in the present modified example is different from the above-described MEMS mirror 100A illustrated in FIG. 4 to FIG. 6 in that the piezoelectric bodies for control 14A and the piezoelectric bodies for control 14B are provided in place of the piezoelectric bodies for control 14 continuously arranged on the shaft parts 10B and the beam parts 10C. In the present modified example, the above description will be applied to parts common to MEMS mirror 100C and the MEMS mirror 100A illustrated in FIG. 4 to FIG. 6, and different parts will be described below.

The above description of the piezoelectric bodies for control 14 can be applied to the description of the piezoelectric bodies for control 14A and the piezoelectric bodies for control 14B. The above description of the wirings 16 can be applied to the description of the wirings 16A and the wirings 16B.

Since the piezoelectric bodies for control 14A are arranged on the shaft parts 10B and the piezoelectric bodies for control 14B are arranged on the beam parts 10C, the shaft parts 10B and the beam parts 10C are deformed as the piezoelectric bodies for control 14A and the piezoelectric bodies for control 14B are deformed by application of the control voltage. In the case where the shaft parts 10B on which the piezoelectric bodies for control 14A are arranged and the beam parts 10C on which the piezoelectric bodies for control 14B are arranged are coupled to each other and are regarded as one support part, the force required to deform the support part is smaller than the case where the piezoelectric bodies for control 14 are arranged on either the shaft parts 10B or the beam parts 10C. Thus, the potential difference between the electrode 14a and the electrode 14c can be reduced, and the natural frequency of the flat plate 10A can be adjusted with a small control voltage. In the present modified example, the control voltage to be applied to the piezoelectric bodies for control 14A and the piezoelectric bodies for control 14B is adjusted, and accordingly, the natural frequency of the MEMS mirror 100C can be adjusted.

OTHER EMBODIMENTS

One embodiment has been described above. It should be understood that the statements and drawings incorporated in the disclosure are exemplary and are not limited to particular ones. Various alternative embodiments, examples, and operational techniques will become apparent to those skilled in the art from this disclosure. Thus, the embodiment of the present disclosure includes various embodiments not described herein.

Figure 13:
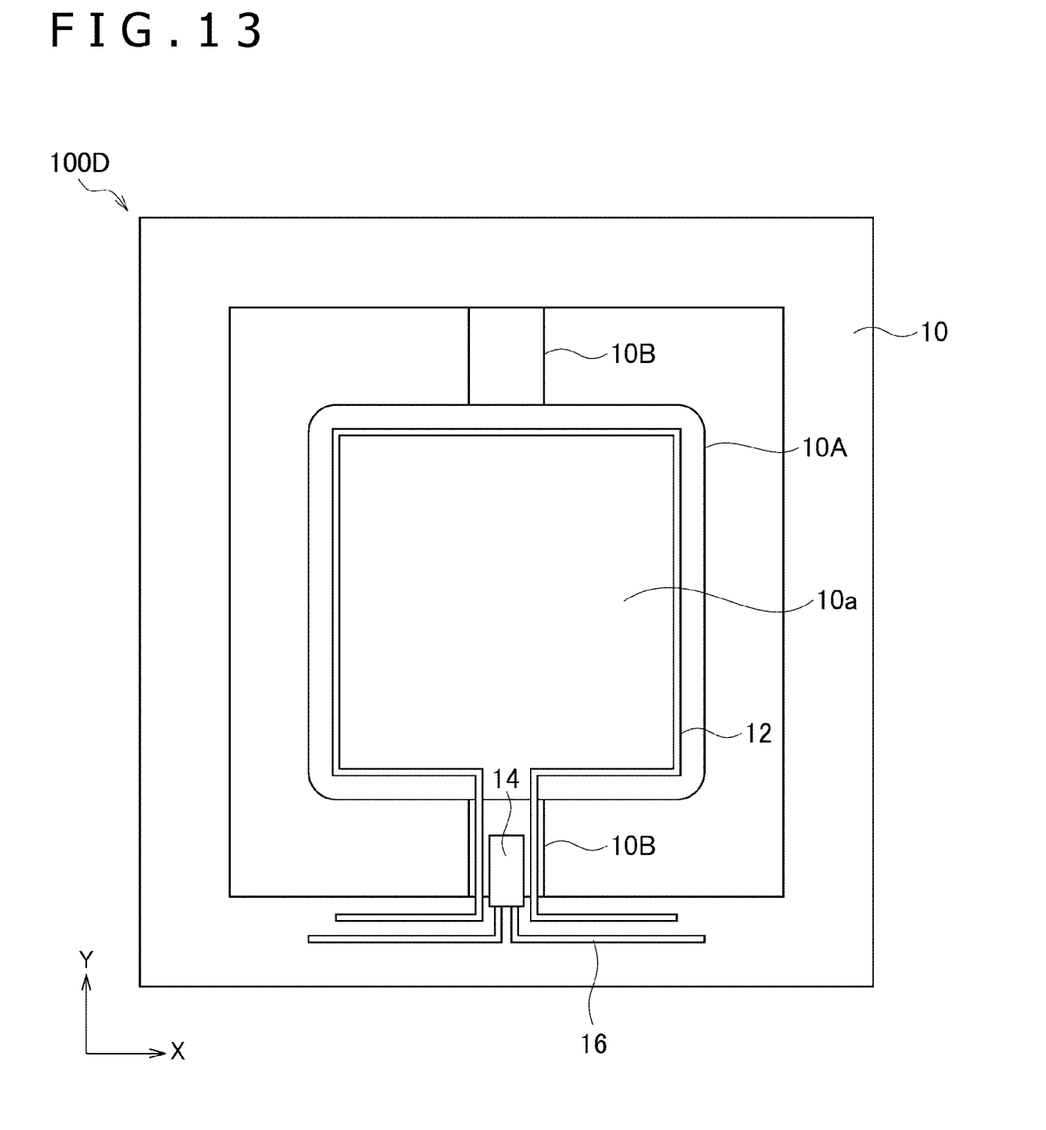
FIG. 13 is a plan view for illustrating a MEMS mirror according to a fourth modified example of the embodiment.

For example, FIG. 13 is a plan view for illustrating a MEMS mirror 100D, and a configuration in which a piezoelectric body for control 14 is arranged on only one of two shaft parts 10B that are disposed to sandwich a flat plate 10A may be employed.

<MEMS Mirror Array System>

A MEMS mirror array system according to an embodiment of the present disclosure will be described by using the drawing.

Figure 14:
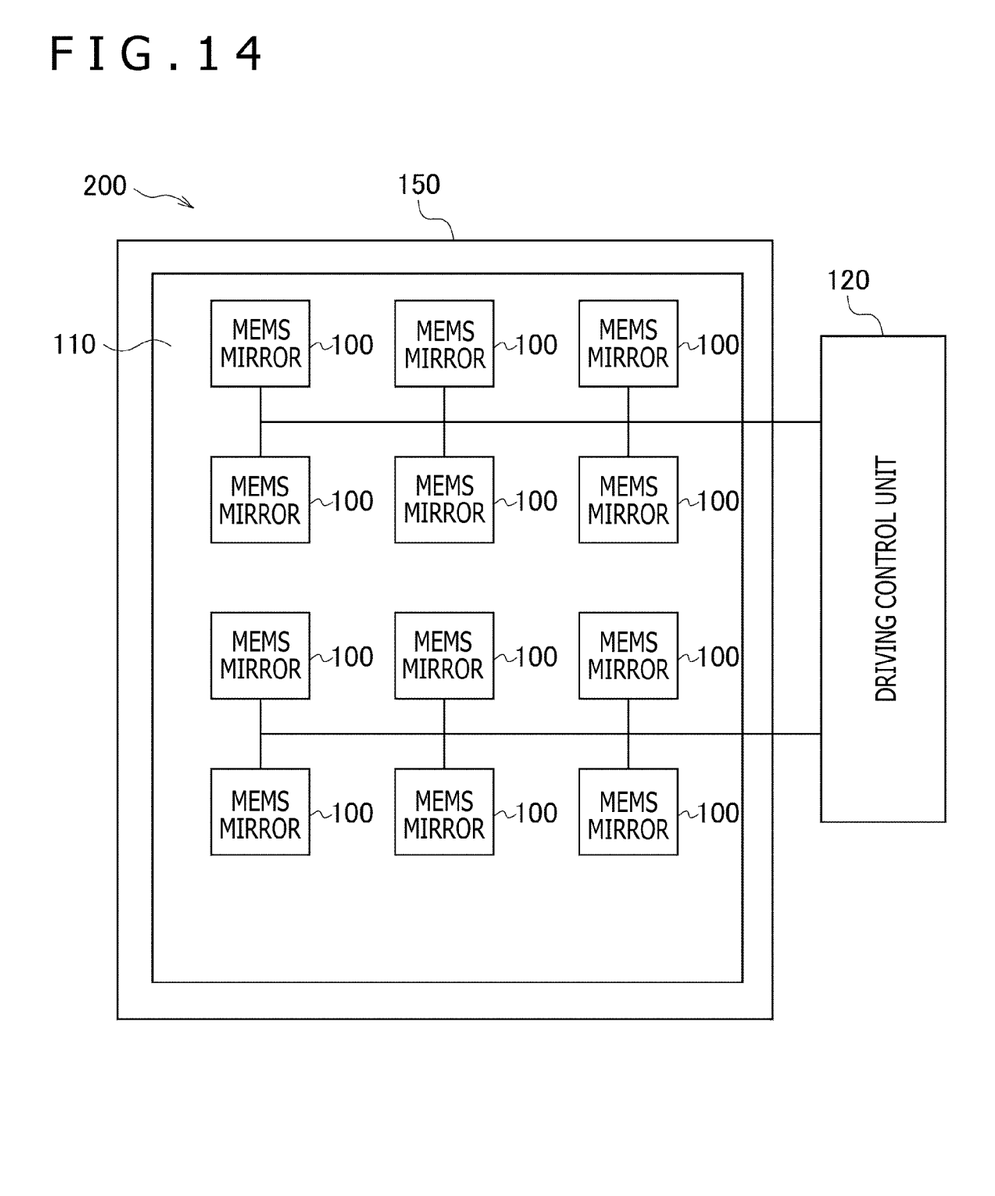
FIG. 14 is a block diagram for illustrating a MEMS mirror array system according to an embodiment of the present disclosure.

FIG. 14 is a block diagram for illustrating a MEMS mirror array system according to the present embodiment. A MEMS mirror array system 200 of the present embodiment includes a MEMS mirror array 150 and a driving control unit 120. The MEMS mirror array 150 has a plurality of MEMS mirrors (for example, the MEMS mirrors 100) described above, on a base mount 110. The driving control unit 120 controls a control voltage to be applied to each of the piezoelectric bodies for control 14 of the plurality of MEMS mirrors 100.

Although the characteristics of the piezoelectric body for control 14, which is a piezoelectric element, fluctuate due to the finished size such as the film thickness of the piezoelectric film, crystal characteristics of the piezoelectric film, manufacturing quality including minute defects or other defects, environmental factors such as temperature, aging degradation, or other factors, the MEMS mirror array system 200 of the present embodiment can adjust the natural frequency, which fluctuates depending on the environment and the state, for each MEMS mirror 100 that is changed due to such characteristic fluctuations and the flat plate 10A of the MEMS mirror 100 described above.

The base mount 110 is not limited to a particular one as long as the MEMS mirror array 150 can be arranged thereon, and may be, for example, a silicon substrate. If the base mount 110 is a silicon substrate, the frame part 10, the flat plate 10A, the shaft parts 10B, and other parts of the MEMS mirror 100 can be formed by processing the base mount 110. That is, the base mount 110, the frame part 10, the flat plate 10A, and the shaft parts 10B are made of the same material and can be formed as one body, so that the manufacturing process can be further simplified.

The driving control unit 120 includes a general-purpose microcomputer including, for example, a storage unit, a control unit, and an input/output unit, which are not illustrated. In this case, a computer program that functions as the MEMS mirror array system 200 may be installed in the microcomputer. By executing the computer program, the microcomputer controls the plurality of MEMS mirrors 100 included in the MEMS mirror array system 200. The control of the plurality of MEMS mirrors 100 may be executed by software or by dedicated hardware. In addition, the plurality of MEMS mirrors 100 may be controlled by individual hardware.

The storage unit includes a read only memory (ROM), a random access memory (RAM), or a hard disk, for example. The storage unit stores, as data, information such as the driving voltage and the natural frequency of each MEMS mirror 100. The storage unit storing these various pieces of data may be provided in one storage device and configured as a region physically or logically separated, or the storage units each storing data may be provided in a plurality of storage devices physically different from one another.

The control unit includes, as functions, a selection driving control unit and a voltage control unit. The selection driving control unit controls a current to be supplied to the above-described wiring 12 functioning as a metal coil, and controls the MEMS mirror 100 to be driven. The voltage control unit adjusts a control voltage to be applied to the piezoelectric body for control 14 in the driven MEMS mirror 100.

On the basis of the information such as the driving voltage and the natural frequency of each MEMS mirror 100 stored in the storage unit, the control unit decides which MEMS mirror 100 included in the MEMS mirror array 150 is driven and how the control voltage, which is to be applied to the piezoelectric body for control 14 in the MEMS mirror 100 to be driven, is applied. Then, the control unit controls the plurality of MEMS mirrors 100 on the basis of the decision.

Such a configuration makes it possible to align the natural frequencies of the plurality of MEMS mirrors included in the MEMS mirror array or adjust the natural frequencies of some of the MEMS mirrors, and each of the MEMS mirrors can efficiently be driven when the plurality of MEMS mirrors is synchronously driven.

What is claimed is:

1. A microelectromechanical systems mirror comprising:
   a flat plate that is displaceable in a film thickness direction;
   a frame part that is separated from the flat plate and surrounds the flat plate;
   a mirror on the flat plate;
   a wiring on an outer edge of the flat plate, wherein the wiring surrounds the mirror on the flat plate;

a support part that connects the flat plate and the frame part and is smaller in film thickness than the frame part; and a piezoelectric body that is arranged on the support part, wherein a control voltage is applied to the piezoelectric body to deform the piezoelectric body and deform the support part together with the deformation of the piezoelectric body, wherein the piezoelectric body is configured to adjust a spring constant of the support part based on the control voltage.

2. The microelectromechanical systems mirror according to claim 1, wherein the support part includes a shaft part with a double-supported beam shape that has a first end connected to the flat plate and a second end connected to the frame part and that is arranged between the flat plate and the frame part.

3. The microelectromechanical systems mirror according to claim 1, wherein the support part includes a beam part with a double-supported beam shape that has opposite ends connected to the frame part, and a shaft part with a double-supported beam shape that has a first end connected to the flat plate and a second end connected to the beam part.

4. The microelectromechanical systems mirror according to claim 1, wherein the support part is made of a same material as the flat plate.

5. The microelectromechanical systems mirror according to claim 1, wherein the support part is made of a same material as the frame part.

6. The microelectromechanical systems mirror according to claim 1, wherein materials of the flat plate and the support part contain silicon.

7. A microelectromechanical systems mirror array system comprising:

a microelectromechanical systems mirror array that has a plurality of the microelectromechanical systems mirror according to claim 1 on a base mount; and a driving control unit that controls the control voltage applied to each of piezoelectric bodies included in the plurality of microelectromechanical systems mirrors.

* * * * *